United States Patent [19]

Small

[11] Patent Number: 5,810,374
[45] Date of Patent: Sep. 22, 1998

[54] GAME CARRIER

[76] Inventor: Brian T. Small, 1103 Bales Chapel Rd., Jamestown, N.C. 27282

[21] Appl. No.: 621,909

[22] Filed: Mar. 26, 1996

[51] Int. Cl.⁶ .......................................................... B62B 3/00
[52] U.S. Cl. ........................................ 280/47.24; 280/292
[58] Field of Search ..................................... 280/204, 292, 280/416, 415, 47.24, 63, 47.18, 47.33, 41.36, 769, 30, 79.6; 224/519, 520, 521, 484

[56] References Cited

U.S. PATENT DOCUMENTS

| | | | |
|---|---|---|---|
| 3,575,439 | 4/1971 | Lusk | 280/47.3 |
| 3,650,443 | 3/1972 | Haskett | 224/42 |
| 3,907,323 | 9/1975 | Knapp | 280/47 |
| 4,055,354 | 10/1977 | Sharpe | 280/47 |
| 4,063,744 | 12/1977 | Fraser | 280/42 |
| 4,789,180 | 12/1988 | Bell | 280/652 |
| 5,018,651 | 6/1991 | Hull et al. | 224/42.44 |
| 5,039,983 | 8/1991 | Tomosoki | 224/42 |
| 5,620,126 | 3/1997 | Janek | 224/527 |

OTHER PUBLICATIONS

Cabela's Magazine, Annual Spring Catalog 1996, p. 147 advertisement for "Hitch–Haul" Carrier.

Gander Mountain, Fall, 1995, p. 169, advertisements for "Hitch–haul" Carrier & p. 213 Warren & Sweat Game Carrier.

*Primary Examiner*—Brian L. Johnson
*Assistant Examiner*—Jonathan E. Butts

[57] ABSTRACT

A carrier for transporting large game is provided having a bed formed from a smooth semi-circular cross-sectional shaped polymeric material which is mounted on a wheeled frame. A reversible handle allows the bed to be easily loaded and a rail is positioned beneath the bed for cooperatively engaging rail guides affixed to a vehicle support. The game carrier can be loaded, for example, in the woods and can then be pulled manually to a vehicle parking site. The wheels of the carrier can be removed and the carrier then urged along guides attached to the vehicle support which is retained by conventional vehicle trailer hitch apparatus. Locking pins maintain the carrier on the vehicle support, thus allowing a single hunter to easily transport and load heavy game without undue effort or inconvenience.

3 Claims, 4 Drawing Sheets

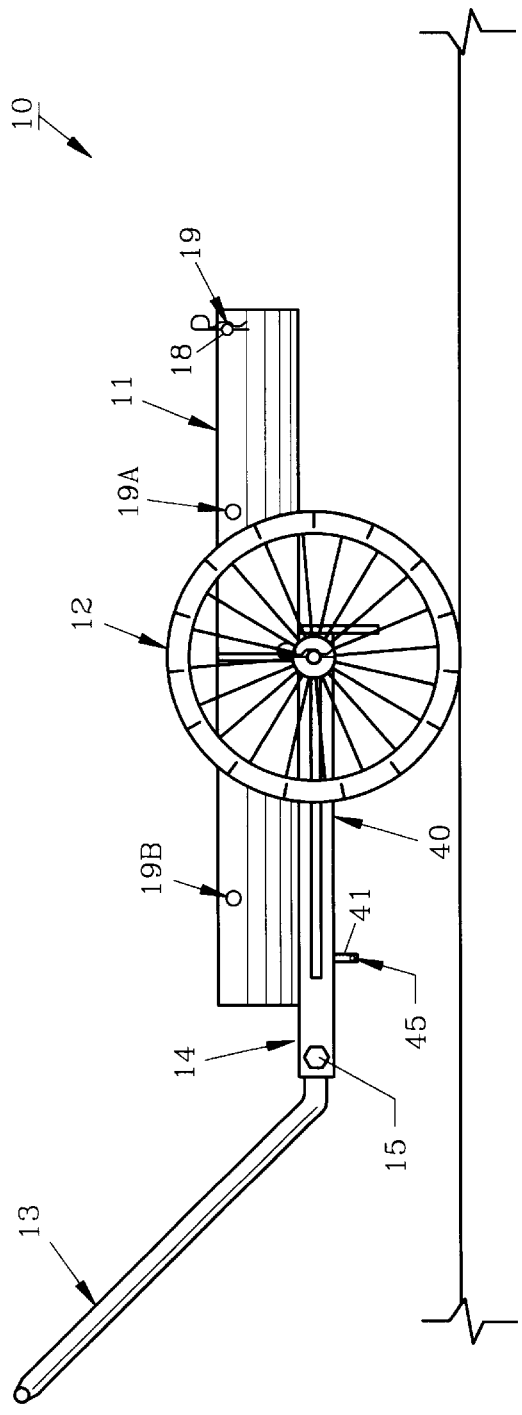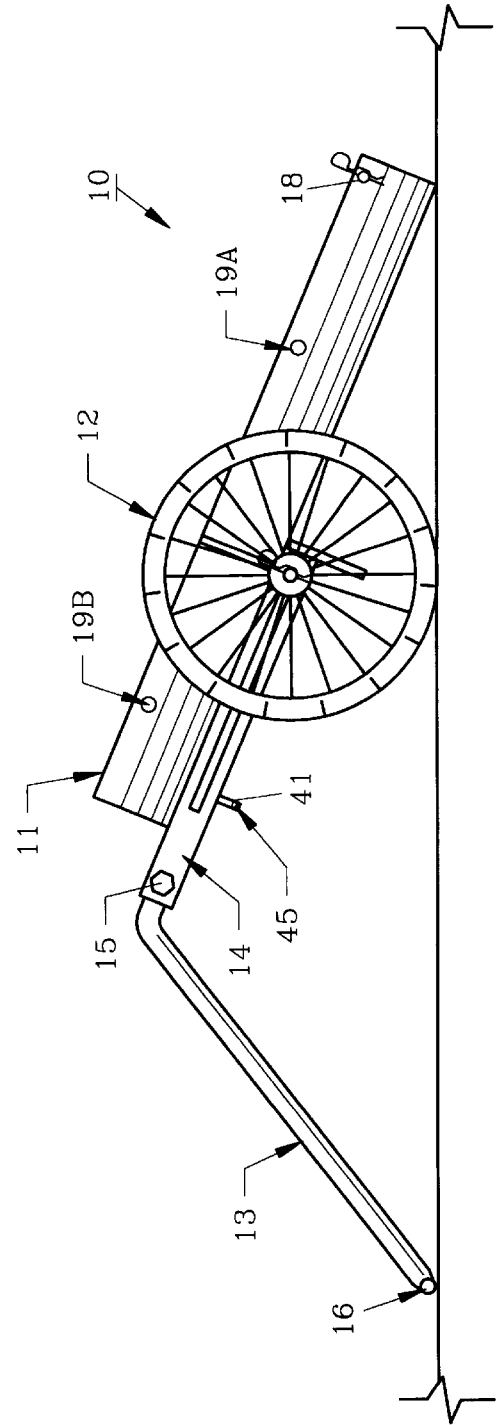

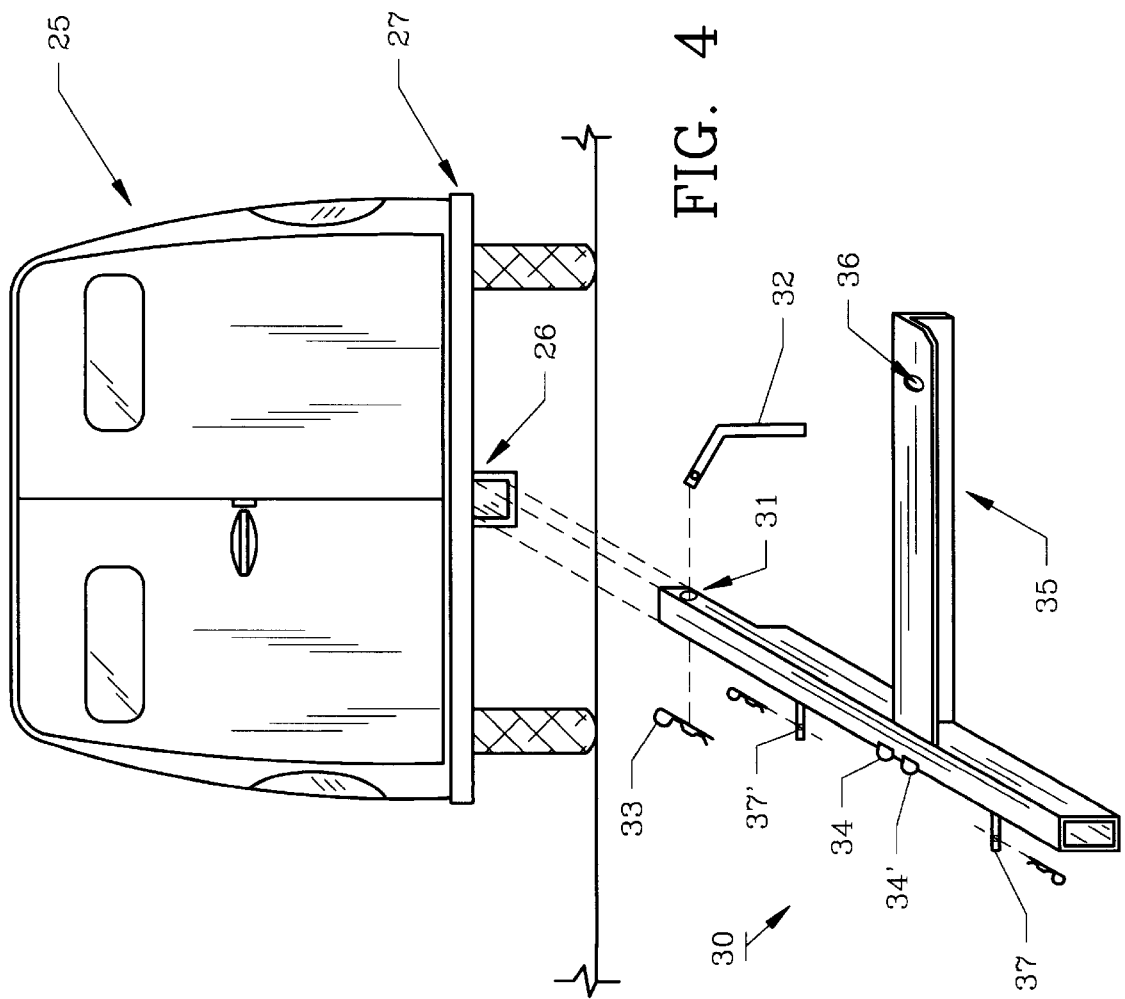

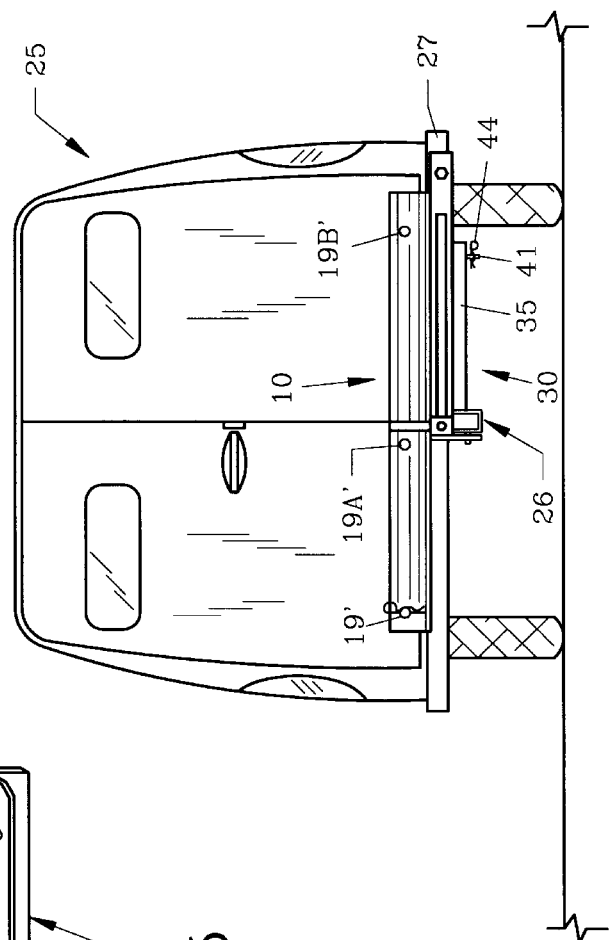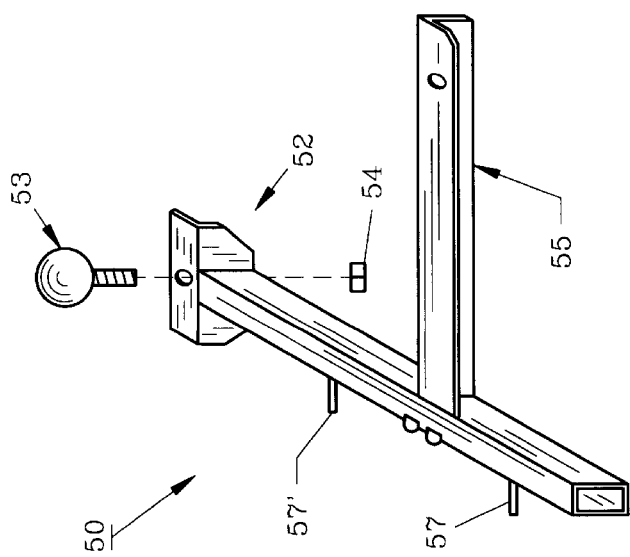
FIG. 5
FIG. 6

GAME CARRIER

BACKGROUND OF THE INVENTION

1. Field Of The Invention

The invention described herein relates to hunting and specifically relates to the transportation of large game animals by an individual hunter. The carrier allows a hunter to easily move large game from a remote site and manually roll the loaded game carrier to a vehicle parking site where the carrier is partially disassembled and affixed to a vehicle support joined to a trailer hitch on the vehicle.

2. Description Of The Prior Art And Objectives Of The Invention

The use of carts and carriers to haul game from remote areas to camp sites or vehicle parking areas has become increasingly popular in recent years. As many large game hunters now hunt alone or in distant areas from other hunters, the problem of handling and moving slain game has increased. Many times a hunter will have to walk a mile or more to locate assistance for carrying game. At other times hunters must carry large game great distances to campsites or parking locations for transportation by vehicles to their homes or other destinations. Also, large game can be difficult if not impossible to load in or on a vehicle by a single hunter and therefore the need has existed for a simple and easy method to remove the game from a carrier and transfer it to a vehicle for final transportation.

U.S. Pat. No. 4,063,744 demonstrates a collapsible game carrier for use by two persons in hauling heavy game. U.S. Pat. No. 3,907,323 demonstrates a game cart which includes a wheeled mounted frame for removing game from rough country to a vehicle. U.S. Pat. No. 3,575, 439 provides a game cart for towing behind a motorized vehicle. U.S. Pat. No. 1,038,983 illustrates a typical carrier which is affixed to a trailer hitch, exterior of the vehicle for use in hunting.

All of the above inventions are useful in certain circumstances but all have shortcomings in handling and transporting large game by an individual, and therefore the present invention was conceived and one of its objectives is to provide a game carrier which minimizes lifting and loading of large game.

Another objective of the present invention is to provide a game carrier which has detachable parts for compact storage of the carrier exterior of a vehicle with the use of a trailer hitch.

It is another objective of the present invention to provide a game carrier which has a smooth, semi-circular polymeric bed with open ends.

It is also an objective of the present invention to provide a game carrier which includes a reversible handle for use in manually pulling the carrier from a kill area to a vehicle parking site in one mode and in a second mode, for stabilizing the carrier during loading.

It is yet another objective of the present invention to provide a carrier vehicle support which allows the game carrier to be urged thereupon with minimum physical effort.

Various other objectives and advantages of the present invention will become apparent to those skilled in the art as a more detailed description is set forth below.

SUMMARY OF THE INVENTION

The game carrier as described herein utilizes a semi-circular bed formed from a rigid polymeric material which is attached to a rigid metal frame. The frame includes a wheel axle and a reversible handle is affixed to the frame. A vehicle support is used in combination with the game carrier for transporting the carrier by a vehicle with possibly game contained therein, over long distances. The vehicle support is joined to a conventional trailer hitch positioned beneath a vehicle to allow a hunter to easily attach the carrier with game to the vehicle without undue effort or inconvenience. The wheels of the carrier are detached and a rail beneath the bed of the carrier allows it to slide along guides on the vehicle support where it is affixed for transportation purposes. Once affixed, the handle is removed and can be placed inside the vehicle, in addition to the wheels, for extended transportation.

The handle is reversible to steady the carrier bed as for example when loading heavy game therein. Once the game has been loaded, the handle is reversed and the carrier can then be pulled for example through the woods to a camp site or vehicle parking area.

BRIEF DESCRIPTION OF THE DRAWINGS

FIG. 1 demonstrates a side elevational view of the preferred embodiment of the game carrier with the handle in the normal position for rolling the carrier as when loaded with game;

FIG. 3 depicts the carrier of FIG. 1 but with the handle reversed as for use in loading game therein;

FIG. 4 shows a conventional vehicle with the preferred form of the vehicle support removed from the vehicle hitch;

FIG. 5 demonstrates an alternate embodiment of a vehicle support as removed from the vehicle;

FIG. 6 pictures the game carrier as seen in FIG. 1 attached to the vehicle support of FIG. 4 with the handle and wheels detached.

DESCRIPTION OF THE PREFERRED EMBODIMENT AND OPERATION OF THE INVENTION

Figure 2:
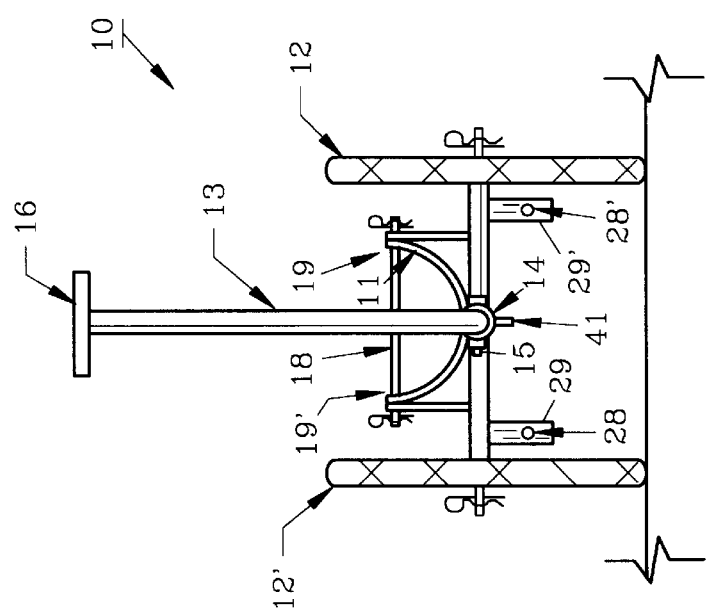
FIG. 2 illustrates a front view of the carrier as shown in FIG. 1.

Turning now to the drawings for a more complete understanding of the invention and its operation, FIG. 1 shows game carrier 10, the preferred embodiment, having a bed 11 for containing game such as deer, bear, elk or the like as may be hauled over rough terrain or through woods to a parked vehicle. Carrier 10 can also be used as a utility cart for transporting supplies over rough terrain, or for carrying corn or other feed to hunting areas for baiting purposes. Bed 11 may be formed of a smooth surface material such as suitable conventional plastics and as shown in FIG. 2, has a generally semi-circular cross section which has been found particularly useful for drainage, cleaning and the like. Wheels 12, 12' have a fairly large diameter, for example 50 centimeters, for ease in rolling game over rough terrain. Two wheels provide needed stability over prior one-wheel designs. Handle 13 is joined to frame 14 by bolt 15 and includes lateral grip 16 as seen in FIG. 2. In FIG. 3, handle 13 is shown in a reversed posture which, because of its somewhat V-shape, allows bed 11 to tilt to an angle of approximately 28° which is useful for loading large game. With bed 11 so tilted as seen in FIG. 3 and stop bar 18 removed, game can be dragged into bed 11 and slid therein without the need of lifting the game totally from the ground. After loading, stop bar 18 is replaced, bolt 15 removed, handle 13 is rotated to its normal position as shown in FIG. 1, and bolt 15 replaced and nut 17 (FIG. 7) retightened for manual hauling purposes.

Figure 7:
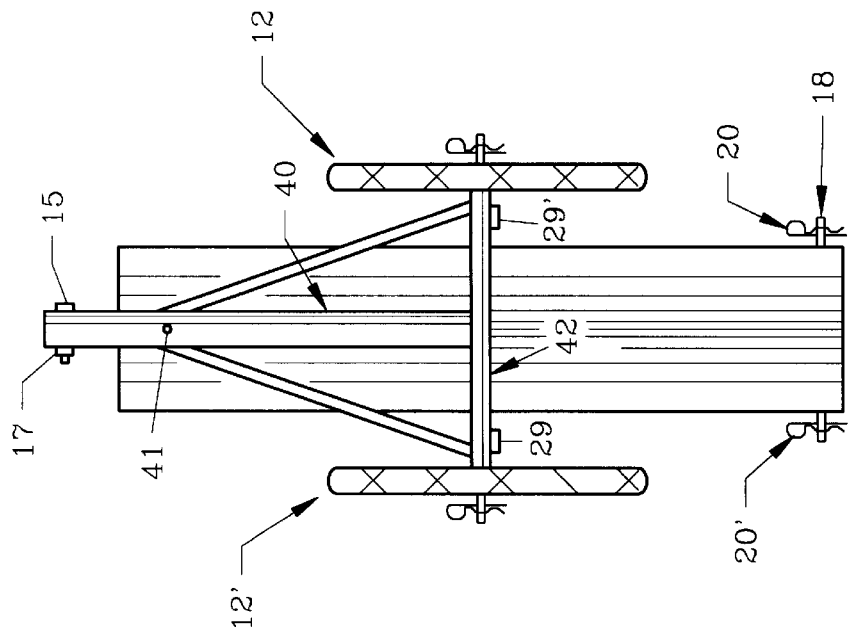
FIG. 7 illustrates a bottom plan view of the game carrier of FIG. 1 but with the handle removed.

Lateral stop bar 18 as seen in FIG. 2 passes through openings 19, 19' on opposite sides of bed 11 and is held in place by conventional clips 20, 20' as shown in FIG. 7. Stop bar 18 prevents game from sliding out the open rear end of semi-circular bed 11 as it is being hauled. Straps or ropes can also be used to tie game into bed 11 by passing it through openings 19,19', 19A, 19A', and 19B, 19B' which are opposingly positioned on bed 11 as seen in FIGS. 3 and 6.

Vehicle 25 is seen in FIG. 4 with T-shaped vehicle support 30 removed therefrom. Vehicle support 30 slidably engages conventional tubular hitch 26 positioned beneath bumper 27. Vehicle support 30 defines opening 31 which is coincidentally placed with openings (not shown) in vehicle hitch 26 whereby latch pin 32 will pass therethrough and be secured in place by clip 33. Once in place, carrier 10 can be rolled to vehicle support 30 and be brought into engagement therewith by directing rail 40 (FIG. 7) to engage rounded, spaced rail guides 34, 34' seen in FIG. 4. Rail 40 extends from locking stud 41 shown in FIG. 7 to wheel axle 42. Axle 42 is centered along bed 11 to provide balance as heavy game is hauled therein. With rail 40 tilted upwardly and locking stud 41 positioned between rail guides 34, 34', wheels 12, 12' are then removed from carrier 10 and then by urging handle 13 forwardly, game bed 11 is manually pulled upwardly and left to right (as seen in FIG. 4), onto vehicle support 30 with rail 40 supported by rail shelf 35. Game bed 11 is secured in place with locking stud 41 positioned through opening 36 and with locking pins 37, 37' engaging, respectively, openings 28, 28' in depending brackets 29, 29'. As further shown in FIG. 6, clip 44 is positioned through opening 45 of locking stud 41 to maintain game bed 11 securely on vehicle support 30. Once secured, bolt 15 is removed and handle 13 detached from frame 14. Handle 13 and wheels 12, 12' can then be conveniently transported within vehicle 25.

An alternate embodiment of the vehicle support is seen in FIG. 5 whereby vehicle support 50 is shown having locking pins 57, 57' with rail shelf 55. Bumper mount 52 can be affixed to a vehicle by means of ball hitch 53 and nut 54 by removing the ball-type hitch affixed to many vehicle bumpers. As would be understood, vehicle support 50 is used with vehicles having a ball-type hitch 53 as opposed to vehicles equipped with under the bumper tube type hitches 26 as shown in FIG. 4.

As seen in FIG. 6, carrier 10 is secured to vehicle 25 by means of vehicle support 30 with wheels 12, 12' and handle 13 removed. With carrier 10 so placed, large game can be transported over long distances exteriorly of vehicle 25 without damage or staining thereto. After arriving at the desired destination, clip 44 can be removed and carrier 10 unloaded with game by sliding it from vehicle support 30 (right to left as seen in FIG. 6). Handle 13 and wheels 12, 12' can again be replaced on carrier 10 and carrier 10 rolled to a desired site. Latch pin 32 (FIG. 4) can also be removed so vehicle support 30 can also be removed and stored for future use.

Other embodiments of the invention can be designed by those skilled in the art and the examples and illustrations set forth above are merely for exploratory purposes and are not intended to limit the scope of the appended claims.

I claim:

1. A game carrier in combination with a vehicle support, said game carrier comprising: a frame, a game bed, said game bed attached to said frame, said game bed having a continuous semi-circular cross-section, formed from a smooth polymeric material, a wheel axle, said wheel axle affixed to said frame, said frame comprising a rail, said rail positioned beneath said game bed, a pair of wheels, said wheels for removable attachment to said wheel axle and a removable handle, said handle having a first position and a second position, said handle having a bent portion, said bent portion forming a v-shape when in said first position to facilitate pulling said game carrier, said bent portion forming an inverted v-shape when in said second position to tilt said game carrier at an angle to facilitate loading of game thereon, said handle having a lateral grip for pulling said game carrier, said rail disposed between said handle and said axle, said rail comprising a vertical locking stud and a plurality of depending brackets, and said vehicle support comprising a means to guide said frame rail, said rail guiding means comprising a pair of spaced rail guides, said rail guides disposed on said vehicle supports said rail guides rounded to engage said frame rail, and wherein said vehicle support is substantially t-shaped and formed from metal, said support comprising a plurality of horizontal locking pins and defining an opening for engagement with said depending brackets and vertical locking stud respectively.

2. The combination of claim 1 further comprising a stop bar, said stop bar for releasable attachment to said game bed.

3. The combination of claim 1 wherein said game bed defines a pair of opposing apertures, a stop bar, said stop bar positioned within said apertures.

* * * * *